United States Patent
Serrano et al.

(10) Patent No.: US 7,468,566 B2
(45) Date of Patent: Dec. 23, 2008

(54) AUTOMATIC TRANSFER SWITCH APPARATUS

(75) Inventors: Mark Anthony Serrano, Chicago, IL (US); Faroog Shamieh, Mount Prospect, IL (US); Kenneth C. Krchak, Crystal Lake, IL (US)

(73) Assignee: General Electric Company, Schenectady, NY (US)

( * ) Notice: Subject to any disclaimer, the term of this patent is extended or adjusted under 35 U.S.C. 154(b) by 129 days.

(21) Appl. No.: 11/283,986

(22) Filed: Nov. 21, 2005

(65) Prior Publication Data

US 2007/0114958 A1   May 24, 2007

(51) Int. Cl.
*H02J 9/06* (2006.01)
(52) U.S. Cl. .............................. 307/68; 307/67; 307/112
(58) Field of Classification Search .................... 307/67, 307/68
See application file for complete search history.

(56) References Cited

U.S. PATENT DOCUMENTS 5,739,594 A * 4/1998 Sheppard et al. .............. 307/64
6,819,012 B1 * 11/2004 Gabrys ......................... 307/68
6,849,967 B2 * 2/2005 Lathrop et al. ................ 307/64

OTHER PUBLICATIONS

"Basic Concepts of SSRs", Omron, Chapter 1, Section 1-1, pp. 8-13, 2001.

* cited by examiner

*Primary Examiner*—Michael J Sherry
*Assistant Examiner*—Hal I Kaplan
(74) *Attorney, Agent, or Firm*—Cantor Colburn LLP

(57) ABSTRACT

An Automatic Transfer Switch (ATS) having a switch configured to connect one of two sources to a load, a mechanical drive, an actuator, and a solid state control relay is disclosed. The mechanical drive is configured to drive the switch between a first position and a second position, the first position connecting the switch to the first source, and the second position connecting the switch to the second source. The actuator is in mechanical communication with the mechanical drive to cause the mechanical drive to move on command. The solid state control relay is responsive to an external signal and productive of a control signal, wherein the actuator is responsive to the control signal to cause the mechanical drive to move.

15 Claims, 4 Drawing Sheets

US 7,468,566 B2

AUTOMATIC TRANSFER SWITCH APPARATUS

BACKGROUND OF THE INVENTION

The present disclosure relates generally to electrical distribution systems, and particularly to Automatic Transfer Switches.

Electrical distribution systems employ a variety of devices for controlling and managing the distribution of electrical power, including Automatic Transfer Switches. In general, an Automatic Transfer Switch (ATS) is a device that connects one of two power sources to a load, so that the load may receive electrical power in the event that one of the power sources becomes non-operational. Such devices are often employed in applications requiring emergency backup power generation, such as hospitals for example, where the primary source of power comes from a utility grid, and the alternate source of power comes from a backup generator. Many of the known ATSs employ electromagnetic switching relays coupled with rectifiers to provide control power and signaling to operate the switch of the ATS system. In these types of systems, the rectifier converts AC power to DC control power, and the electromagnetic relay provides the switching signals. In standard transition ATSs, that is, where the switch is connected to either one source or the other, a minimal number of components are required in order to provide the appropriate switching signals. However, in more complex systems, such as open transition ATSs where the switch of the ATS may be placed in an isolation position, a greater number of control components are required, which results in an ATS that requires additional real estate and wiring, thereby increasing the size and cost of the ATS. Also, due to the switching characteristics of electromagnetic relays, preventative maintenance of the ATS system is periodically required.

Accordingly, there is a need in the art for an ATS arrangement that overcomes these drawbacks.

BRIEF DESCRIPTION OF THE INVENTION

An embodiment of the invention includes an Automatic Transfer Switch (ATS) having a switch configured to connect one of two sources to a load, a mechanical drive, an actuator, and a solid state control relay. The mechanical drive is configured to drive the switch between a first position and a second position, the first position connecting the switch to the first source, and the second position connecting the switch to the second source. The actuator is in mechanical communication with the mechanical drive to cause the mechanical drive to move on command. The solid state control relay is responsive to an external signal and productive of a control signal, wherein the actuator is responsive to the control signal to cause the mechanical drive to move.

Another embodiment of the invention includes an Automatic Transfer Switch (ATS) having a switch configured to connect one of two sources to a load, a mechanical drive system, and a solid state control relay. The mechanical drive system is configured to drive the switch between a first position and a second position, the first position configured to connect the load to the first source, and the second position configured to connect the load to the second source. The solid state control relay is responsive to a command signal and productive of a control signal, wherein the mechanical drive system is responsive to the control signal to cause the switch to move.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides an Automatic Transfer Switch (ATS) with a solid state control relay for energizing and driving a mechanical drive system that actuates the switch for switching between power sources. The solid state control relay is capable of converting AC power to DC power while simultaneously switching ON and OFF high voltage (120 VAC to 600 VAC for example) and high current signals to a main drive solenoid on contactor style ATSs. While an embodiment of the invention described herein depicts as an example a mechanical drive system having a solenoid driving a power contactor, which in turn powers a motor operated mechanism for switching between power sources, it will be appreciated that the disclosed invention is also applicable to other drive systems, such as one actuated by a linear motor for example. Embodiments of the invention may be used in, but are not limited to, the industrial and commercial markets throughout the U.S. and the World where ATS systems are being employed, such as for emergency backup power generation for example.

Figure 1:
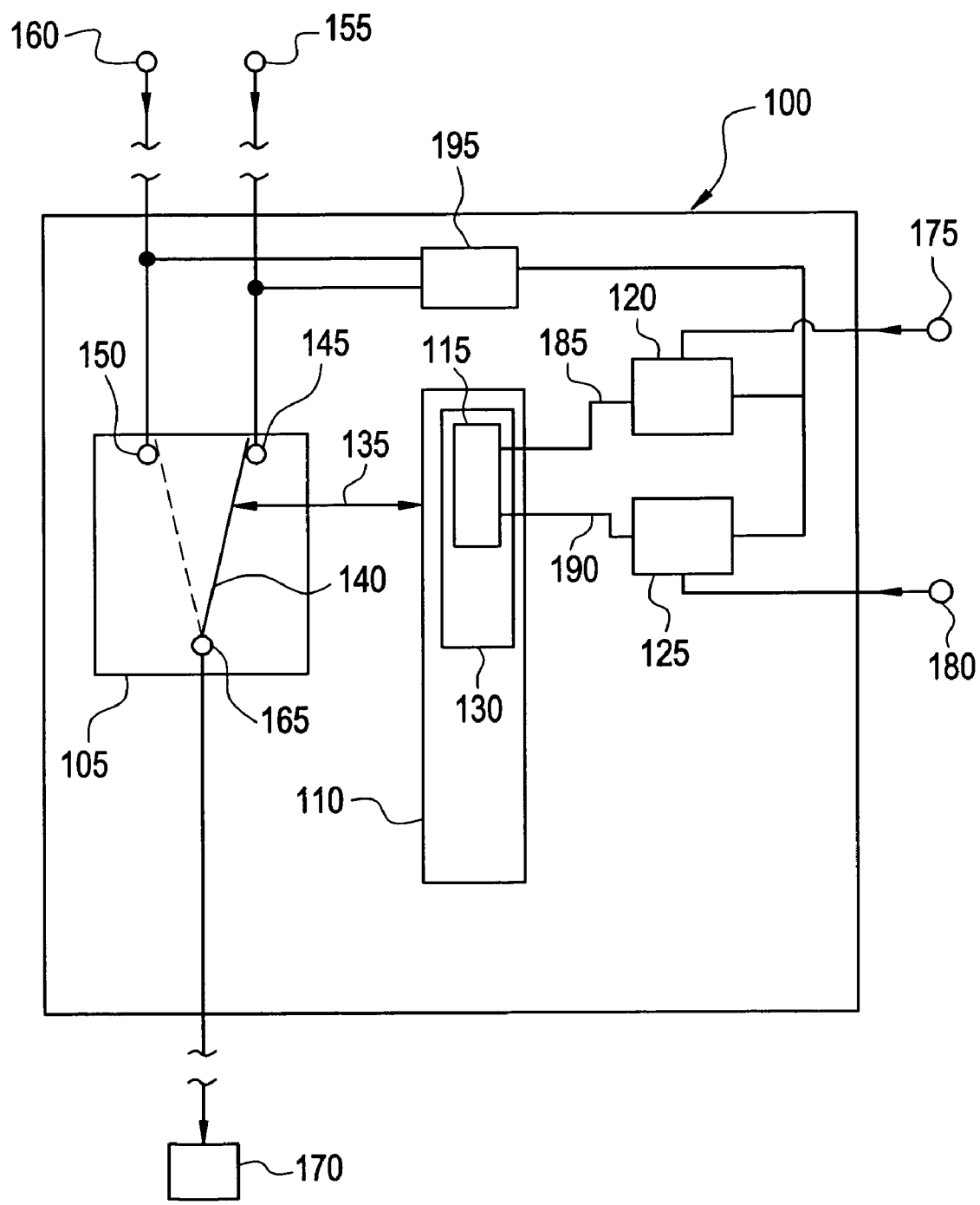
FIG. 1 depicts in block diagram form an Automatic Transfer Switch in accordance with an embodiment of the invention.

FIG. 1 is an example of an embodiment of an Automatic Transfer Switch (ATS) 100 having a switch 105, a mechanical drive 110, an actuator 115, and a pair of solid state control relays (SSCR) 120, 125. In an embodiment, each SSCR 120, 125 includes a triac, which will be discussed in more detail below, for switching ON and OFF high voltage and for converting AC voltage to DC voltage. In an embodiment, the actuator 115 is a DC solenoid, and is mounted directly onto a power contactor 130 that powers the mechanical drive 110, which in an embodiment is a motor operated mechanism. A command signal, discussed in more detail below, sets the transfer sequence into motion. The mechanical drive 110 is connected to the switch 105 via gears or linkages 135, which drives the contact arm 140 of switch 105 between a first position that makes contact with a first contact 145, and a second position that makes contact with a second contact 150. First contact 145 is in power communication with a first power source 155, and second contact is in power communication with a second power source 160. First and second power sources 155, 160 may include but are not limited to utility grids, fuel powered generators, solar powered voltage sources, wind powered voltage sources, water-turbine powered voltage sources, fuel cells, or any other source of electrical power. It should be noted that FIG. 1 is illustrated in a one-line diagram form, thereby representing either a single-phase or a three-phase power distribution system. A connection point 165 at the load side of switch 105 provides for electrical connection from the ATS 100 to a load 170.

Each SSCR 120, 125 is in signal communication with an external signal source 175, 180, and is productive of a control signal, represented by control lines 185, 190. In response to an external signal, such as an operator commanding the ATS 100 to change state or an automatically generated transfer signal from a command station, a control signal is generated by one of the SSCRs 120, 125, which causes the actuator 115 to operate the contactor 130, which powers the mechanical drive 110, which causes the switch 105 to move.

For example, with the ATS 100 originally connected to the first power source 155, and in response to a first external signal 175, the first SSCR 120 is activated and sends a control signal 185 to the actuator 115 to cause the mechanical drive system 110 to move the switch 105 from the first position connecting with the first contact 145 to the second position connecting with the second contact 150, thereby switching from the first source 155 to the second source 160. In the reverse direction, and in response to a second external signal 180, the second SSCR 125 is activated and sends a control signal 190 to the actuator 115 to cause the mechanical drive system 110 to move the switch 105 from the second position (second contact 150) to the first position (first contact 145), thereby switching from the second source 160 to the first source 155.

In an embodiment, movement of the mechanical drive system 110 and switch 105 between the first and second positions (contacts) 145, 150 includes a time delay, thereby allowing voltage transients to subside prior to switching from one source onto another. This time delay may result from delayed inertial movement of the mechanical drive system 110 and switch 105, or may be provided by a separate timing circuit (not shown) that controls the speed of operation of the mechanical drive system 110.

In an embodiment, each SSCR 120, 125 receives high voltage AC power from whichever source 155, 160 is active, via an isolation circuit 195.

Figure 2:
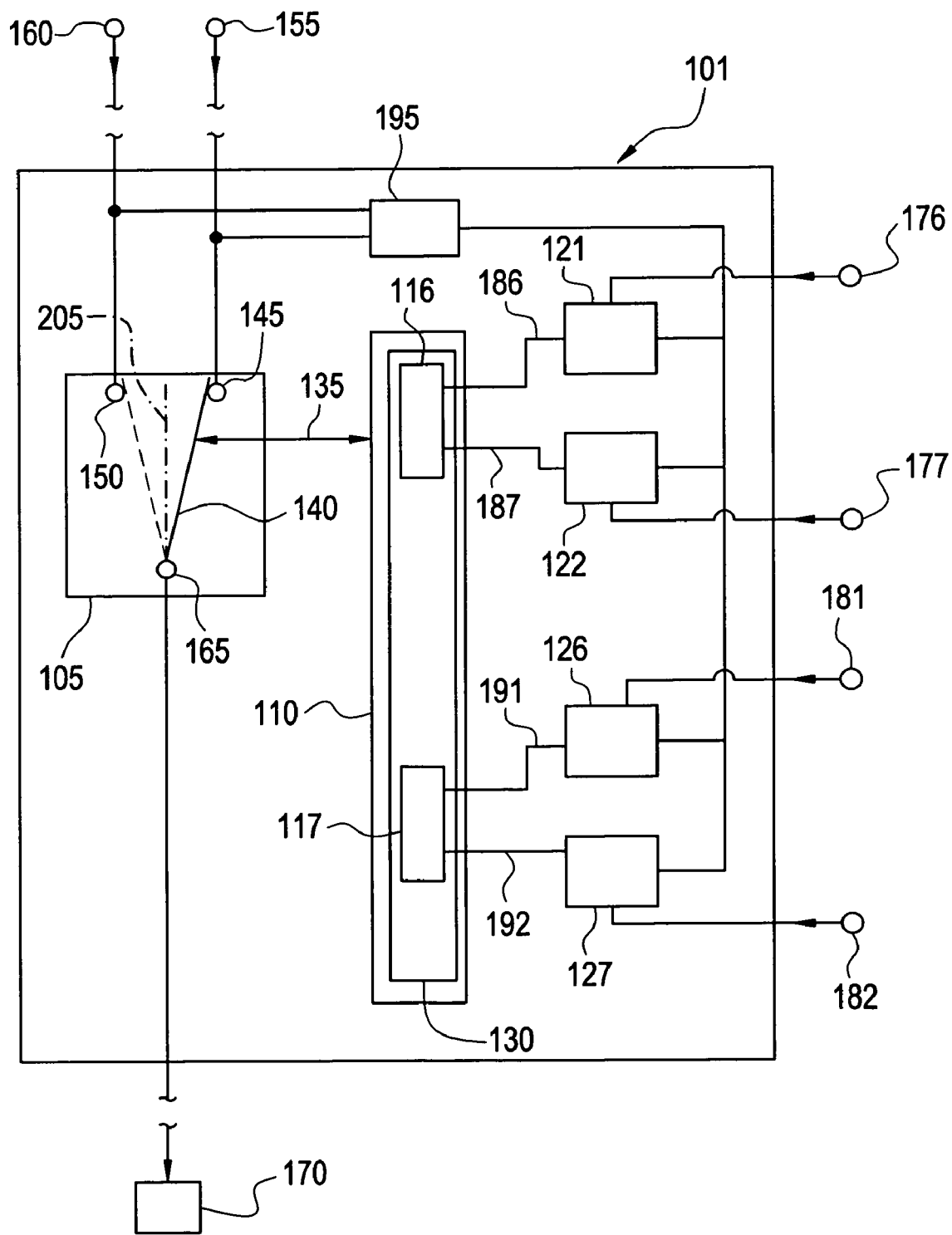
FIG. 2 depicts in block diagram form another Automatic Transfer Switch in accordance with an embodiment of the invention.

The embodiment depicted in FIG. 1 is referred to as a standard transition ATS. That is, the ATS 100 switches between a first position connecting to a first source 155, and a second position connecting to a second source 160, and vice versa. An alternative embodiment, referred to as an open transition ATS is depicted in FIG. 2. An open transition ATS provides for a third position, an open circuit position, where the switch is not connected to either the first source 155 or the second source 160.

Referring now to FIG. 2, which illustrates an open transition ATS 101, the contact arm 140 of switch 105 is depicted having a first position (connecting to first contact 145), a second position (connecting to second contact 150), and a third position 205 that connects to neither contact 145, 150. As such, the third position of switch 105 results in the switch 105 being isolated from both the first source 155 and the second source 160. In the embodiment of FIG. 2, the mechanical drive system 110 is configured, via appropriate control signals that will be discussed in more detail below, to drive the switch 105 to the third position 205 between the first and second positions (contacts) 145, 150.

In the embodiment of FIG. 2, there are two actuators 116, 117, four SSCRs 121, 122, 126 and 127, and four external command signals 176, 177, 181 and 182. With the ATS 101 originally connected to the first source 155, and in response to a first external signal 176, the first SSCR 121 is activated and sends a control signal 186 to the first actuator 116 to cause the mechanical drive system 110 to move the switch 105 from the first position (contact) 145 to the third position 205. In response to a second external signal 177, the second SSCR 122 is activated and sends a control signal 187 to the first actuator 116 to cause the mechanical drive system 110 to move the switch 105 from the third position 205 to the second position (contact) 150. In response to a third external signal 181, the third SSCR 126 is activated and sends a control signal 191 to the second actuator 117 to cause the mechanical drive system 110 to move the switch 105 from the second position (contact) 150 to the third position 205. And, in response to a fourth external signal 182, the fourth SSCR 127 is activated and sends a control signal 192 to the second actuator 117 to cause the mechanical drive system 110 to move the switch 105 from the third position 205 to the first position (contact) 145. By using the appropriate external command signals, the open transition ATS 101 may be positioned to provide power to a load 170 from either source 155, 160, or may be positioned in an isolation position for maintenance.

Figure 3:
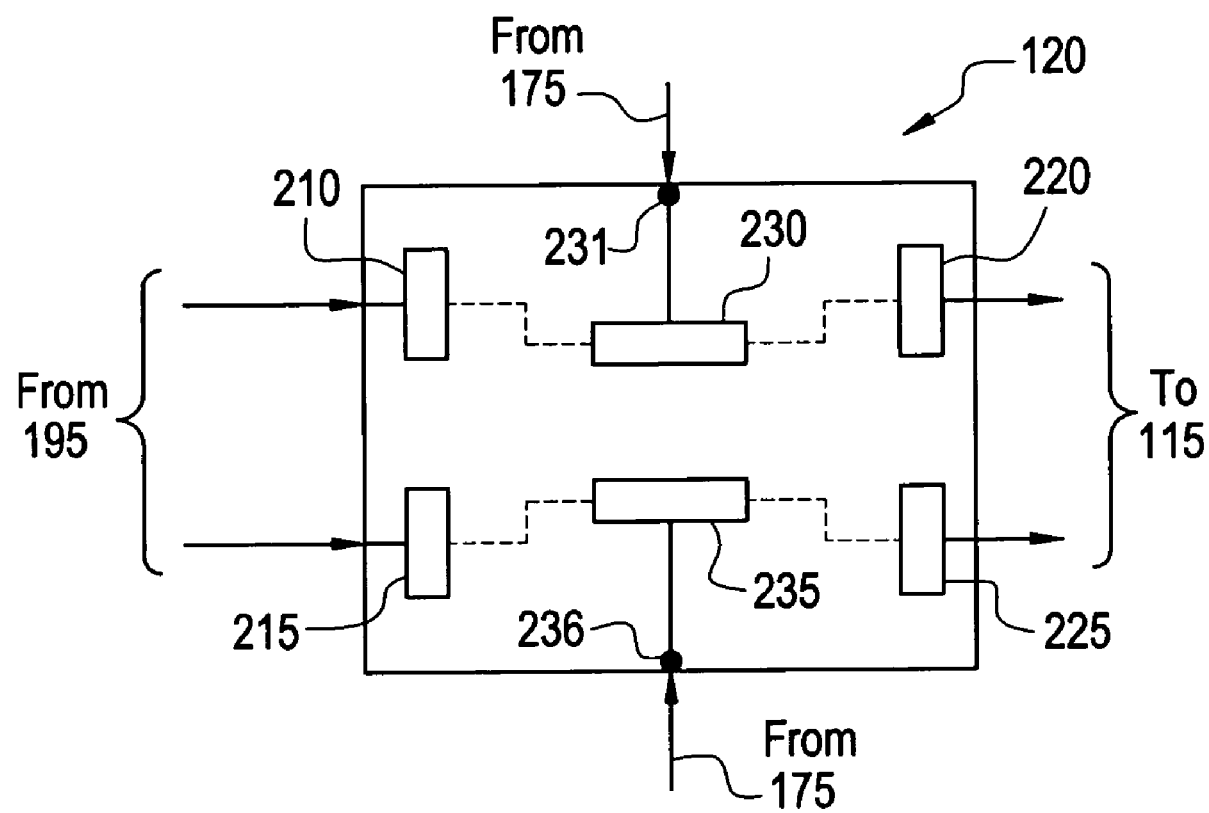
FIG. 3 depicts in block diagram form a solid state control relay for use in accordance with an embodiment of the invention.

Referring now to FIG. 3, an example of a SSCR 120 (also 121, 122, 125, 126 and 127 as illustrated and discussed) is depicted in block diagram form. It will be appreciated that since SSCRs are available as an off-the-shelf item, their physical structure is well known and therefore requires no detailed illustration.

In FIG. 3, SSCR 120 includes a pair of high voltage AC input terminals 210, 215, a pair of high voltage DC output terminals 220, 225, and a pair of triacs 230, 235 having control terminals 231, 236, respectively. The input terminals 210, 215 receive power from isolation circuit 195 (depicted in single line diagram form in FIGS. 1 and 2), the output terminals 220, 225 provide DC power to the actuator 115 (also 116 and 117 as illustrated and discussed), and the triacs 230, 235 receive an external command signal 175 (also 176, 177, 180, 181 and 182 as illustrated and discussed) that energizes the triac in a manner well known in the art to cause the AC input voltage to be converted to DC output voltage and communicated to the actuator 115. In an embodiment, the SSCR 120 is hermetically sealed.

Figure 4:
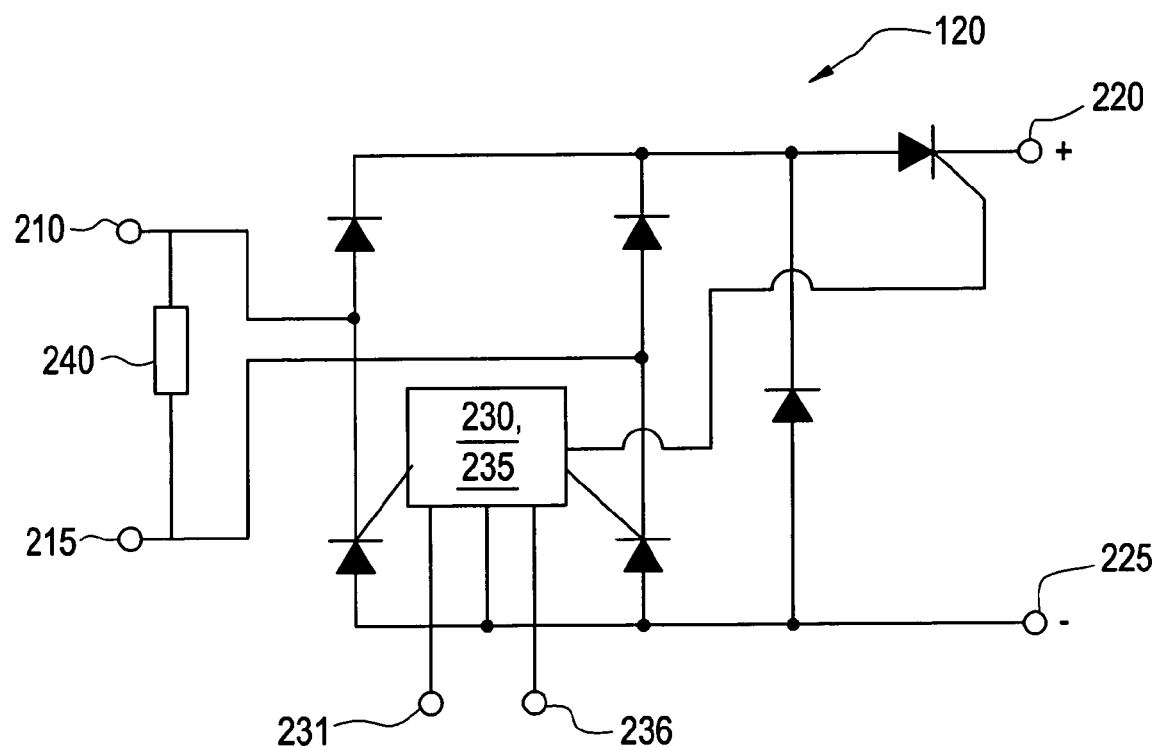
FIG. 4 depicts a schematic of a solid state control relay for use in accordance with an embodiment of the invention.

FIG. 4 depicts a more detailed schematic of an exemplary SSCR 120 having AC input terminals 210, 215, DC output terminals 220, 225, and control terminals 231, 236. As discussed previously, control terminals 231, 236 receive control signals from an external signal source 175, 180 that serves to activate triacs 230, 235, thereby resulting in a DC output at terminals 220, 225 in response to an AC input at terminals 210, 215. In an embodiment, a MOV (metal oxide varistor) 240 is placed across the AC input terminals for transient voltage suppression. The triacs 230, 235 are depicted schematically as being in signal communication with the control terminals 231, 236.

While SSCRs may be generally known in the electronic arts, the selection of particular component values within a particular SSCR 120 for use in accordance with an embodiment of the invention to provide particular input/output characteristics, voltage withstand characteristics, or other specific operational characteristics for an ATS application, are not well known. For example, an embodiment of SSCR 120 for use in accordance with an embodiment of the invention is configured to receive an input voltage level equal to or greater than 120 Vac and equal to or less than 600 Vac, and to deliver an output voltage level equal to or greater than 120 Vdc and equal to or less than 600 Vdc, where the ratio of output voltage level to input voltage level is 1:1. That is, in response to a 120 Vac input, the output will be 120 Vdc, and in response to a 600 Vac input, the output will be 600 Vdc. Also, the AC input terminals 210, 215 are configured to withstand a repetitive peak transient high voltage of equal to or less than 1200 Vac peak without a dielectric breakdown therebetween, and the connections between a DC output terminal 220, 225 and an AC input terminal 210, 215 are configured to withstand a repetitive peak transient high voltage of equal to or less than 2400 Vdc peak without a dielectric breakdown therebetween. Furthermore, an embodiment of SSCR 120 is configured to provide at the DC output terminals 220, 225 a pulsed DC output current equal to or less than 75 Amps, with a voltage drop thereof of equal to or less than 1.7 Vdc at a pulsed DC output current of 75 Amps.

As disclosed, some embodiments of the invention may include some of the following advantages: reduced downtime for preventative maintenance as compared to ATSs employing electromagnetic relays with AC-to-DC rectifiers; by removing the electromagnetic relays, reduced mechanical wear and reduced contact erosion from electrical arcing can be realized; a more compact ATS systems; a less costly ATS systems; an ATS system responsive to just a single set of input signals; reduced electrical connections and wiring harness runs within the ATS; reduced number of parts; ease of assembly; ease of maintenance; high DC voltage output in response to high AC voltage input with a 1:1 output/input ratio; high voltage withstand at the input and output terminals; and, relatively high DC output current (75 Amps) compared to known SSCRs (15-20 Amps).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An Automatic Transfer Switch (ATS), comprising:
a switch configured to connect one of two sources to a load;
a mechanical drive configured to drive the switch between a first position connecting the switch to the first source, second position connecting the switch to the second source, and a third position in which the switch is isolated from the first and second sources;
at least one actuator in mechanical communication with the mechanical drive to cause the mechanical drive to move on command; and
first, second, third and fourth solid state control relays, each of which is responsive to respective first, second, third and fourth external signals and productive of respective first, second, third and fourth control signals, wherein the at least one actuator is responsive to the respective first, second, third and fourth control signals of the respective first, second, third and fourth solid state control relays to cause the mechanical drive to drive the switch from the first position to the third position, from the third position to the second position, from the second position to the third position and from the third position to the first position, respectively.

2. The ATS of claim 1, wherein:
the at least one actuator comprises a DC solenoid;
the mechanical drive system comprises a motor operated mechanism; and
at least one of the first, second, third and fourth solid state control relays comprises a triac.

3. The ATS of claim 1, wherein:
at least one of the first, second, third and fourth solid state control relays is configured to receive AC voltage from either of the first and the second source, and is configured to provide a DC voltage to one of the at least one actuator in response to the external signal.

4. The ATS of claim 1, wherein:
the movement of the mechanical drive between the first and second positions comprises a time delay, thereby allowing voltage transients to subside prior to switching from one source to another.

5. The ATS of claim 1, further comprising:
an electrical isolation circuit disposed between the two sources and at least one of the first, second, third and fourth solid state control relays, thereby allowing the at least one solid state control relay to receive input AC voltage regardless of which source is active.

6. The ATS of claim 1, wherein:
at least one of the first, second, third and fourth solid state control relays comprises AC input terminals and DC output terminals, and is configured to have input/output characteristics according to the following:
an input voltage level equal to or greater than 120 Vac and equal to or less than 600 Vac, an output voltage level equal to or greater than 120 Vdc and equal to or less than 600 Vdc, wherein the ratio of output voltage level to input voltage level is 1:1.

7. The ATS of claim 1, wherein:
at least one of the first, second, third and fourth solid state control relays comprises AC input terminals and DC output terminals, and is configured to have voltage withstand characteristics according to the following:
an absence of dielectric breakdown in response to a repetitive peak transient voltage across the AC input terminals equal to or less than 1200 Vac peak; and
an absence of dielectric breakdown in response to a repetitive peak transient voltage across a DC output terminal and an AC input terminal equal to or less than 2400 Vdc peak.

8. The ATS of claim 1, wherein:
at least one of the first, second, third and fourth solid state control relays comprises AC input terminals and DC output terminals, and is configured to provide at the DC output terminals a pulsed DC output current equal to or less than 75 Amps.

9. The ATS of claim 8, wherein:
at least one of the first, second, third and fourth solid state control relays is configured to develop at the DC output terminals a voltage drop of equal to or less than 1.7 Vdc at the pulsed DC output current of 75 Amps.

10. An Automatic Transfer Switch (ATS), comprising:
a switch configured to connect one of two sources to a load;
a mechanical drive system configured to drive the switch between a first position configured to connect the load to the first source, a second position configured to connect the load to the second source, and a third position in which the load is isolated from the first and second sources; and first, second, third and fourth solid state control relays, each of which is responsive to respective first, second, third and fourth command signals and productive of respective first, second, third and fourth control signals, wherein the mechanical drive system is responsive to the respective first, second, third and fourth control signals of the respective first, second, third and fourth solid state control relays to drive the switch from the first position to the third position, from the third position to the second position, from the second position to the third position, and from the third position to the first position, respectively.

11. The ATS of claim 10, wherein:

at least one of the first, second, third and fourth solid state control relays comprises AC input terminals and DC output terminals, and is configured to have an input/output characteristics according to the following:

an input voltage level equal to or greater than 120 Vac and equal to or less than 600 Vac, an output voltage level equal to or greater than 120 Vdc and equal to or less than 600 Vdc, wherein the ratio of output voltage level to input voltage level is 1:1.

12. The ATS of claim 1, wherein:

at least one of the first, second, third and fourth solid state control relays comprises input terminals, output terminals, and control terminals, and is responsive to a relatively high AC voltage input at the input terminals, and is productive of a relatively high DC voltage output at the output terminals in response to an external command signal at the control terminals.

13. The ATS of claim 5, wherein:

at least one of the first, second, third and fourth solid state control relays comprises input terminals, output terminals, and control terminals, and is responsive to a relatively high AC voltage input at the input terminals, and is productive of a relatively high DC voltage output at the output terminals in response to an external command signal at the control terminals.

14. The ATS of claim 1, further comprising:

an electrical isolation circuit disposed in electrical communication between each of the two sources and each of the first, the second, the third and the fourth solid state control relay, thereby allowing the first, the second, the third and the fourth solid state control relay to receive input AC voltage via a common electrical isolation circuit regardless of which source is active.

15. An Automatic Transfer Switch (ATS), comprising:

a switch configured to connect one of two sources to a load;

a mechanical drive configured to drive the switch between a first position connecting the switch to the first source, a second position connecting the switch to the second source, and a third position in which the switch is isolated from the first and second sources;

at least one actuator in mechanical communication with the mechanical drive to cause the mechanical drive to move on command; and a plurality of solid state control relays, each of which is responsive to a corresponding number of respective external signals and productive of a corresponding number of respective control signals, wherein the at least one actuator is responsive to each of the corresponding number of respective control signals of each of the plurality of solid state control relays to cause the mechanical drive to drive the switch from the first position to the third position, from the third position to the second position, from the second position to the third position, and from the third position to the first position, respectively.

* * * * *